UNITED STATES PATENT OFFICE.

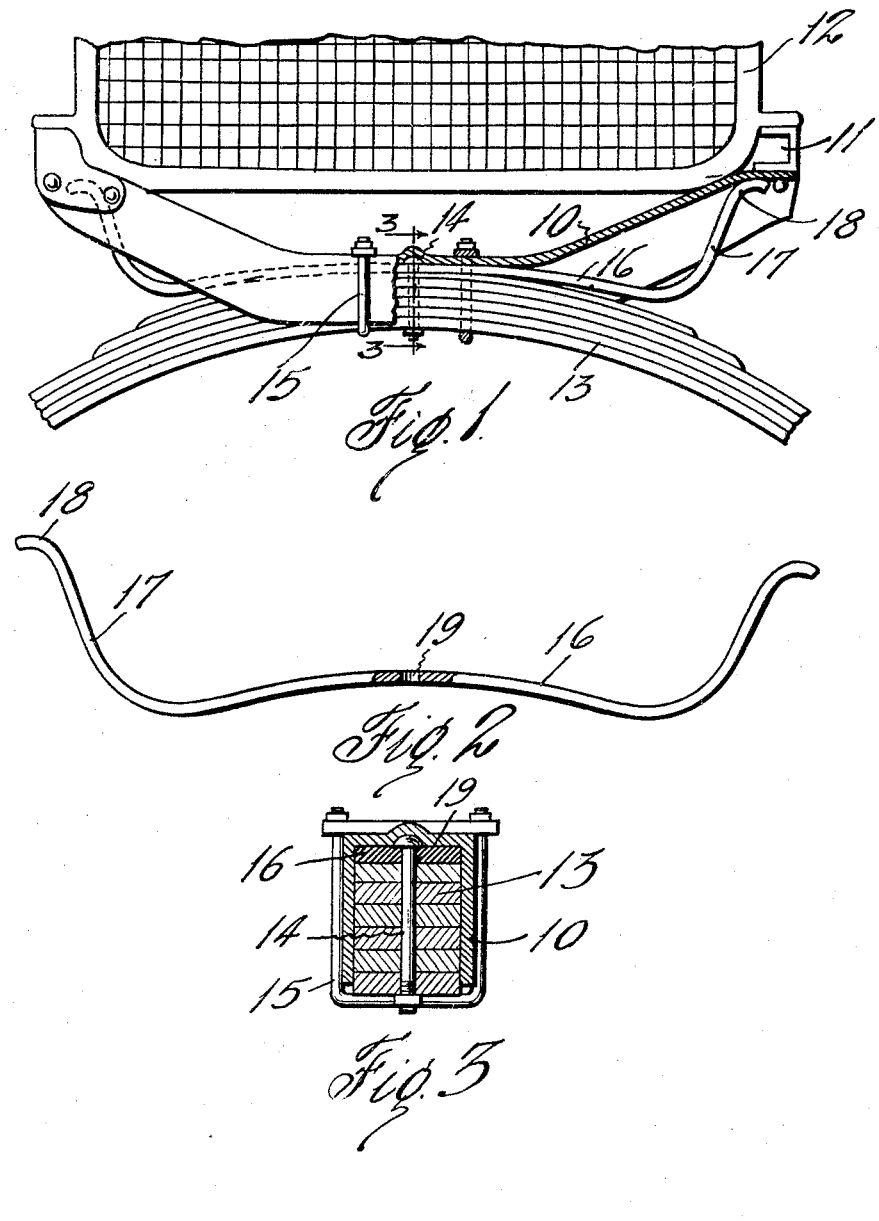

FRED D. BLANTON, OF DALLAS, TEXAS, ASSIGNOR OF ONE-SIXTH TO R. E. MAGALIS, ONE-SIXTH TO P. O. ECKLES, AND ONE-THIRD TO F. P. LEVERETT, ALL OF DALLAS, TEXAS.

CROSS MEMBER AND SPRING PROTECTOR.

1,410,242.     Specification of Letters Patent.     Patented Mar. 21, 1922.

Application filed December 27, 1920. Serial No. 433,159.

*To all whom it may concern:*

Be it known that I, FRED D. BLANTON, a citizen of the United States, residing at Dallas, in the county of Dallas and State of Texas, have invented certain new and useful Improvements in Cross Member and Spring Protectors, of which the following is a specification.

This invention relates to new and useful improvements in cross member and spring protectors.

The front end of the frame of a Ford automobile is connected by a transverse channel or cross member which receives the front springs and is fastened thereto. It frequently happens that this cross member breaks and causes considerable damage, particularly to the radiator and the frame. It is quite difficult to repair a broken cross member and is also comparatively expensive. The weakness of the cross member throws an added burden on the front spring and the leaves of this front spring often break.

It is the object of my invention to provide means for bracing and supporting the cross member and protecting the front spring from breaking. It is further the object to embody such means in a structure that will be readily and comparatively easily placed in position at a slight cost.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is an elevation of a portion of the front end of a Ford automobile, the cross member being equipped with a support constructed in accordance with my invention, said cross member being shown partly in section, Fig. 2 is a front elevation of the support, and Fig. 3 is a cross sectional view taken on the line 3—3 of Fig. 1.

In the drawings the numeral 10 designates the usual cross member and 11 the frame to which said member is riveted. The frame supports the radiator 12. The cross member 10 is in the form of a channel and straddles the front springs 13 which are fastened together by the center bolt 14. The front spring is held in the cross member by means of U-shaped spring clips 15 which embrace the cross member and engage under the spring. These parts are of the usual construction and in applying my invention it is not necessary to alter the same.

I provide a support 16 which is preferably formed of spring steel like the leaves of the spring 13. The support has an arcuate central portion which is merged into upright arms 17 at each end. The arms are inclined slightly outwardly and have their upper end bent outwardly and curved to form bearing bosses 18. At its center the support has a hole 19 for receiving the bolt 20.

In installing the support the frame 11 is jacked up so as to take the weight off of the front spring 13. The clips 15 are removed so that the front spring may be moved out of the cross member 10. The bolt 14 is removed from the spring and the support 16 is placed on top of the spring and the bolt inserted through the hole 19 and then passed through the leaves of the spring 13 and fastened. The support will rest on top of the spring and extend parallel therewith. The spring is now placed back in the cross member, the arms 17 first being inserted in the cross member so that the bosses 18 engage under the frame 11. The clips 15 are then placed in position and the parts fastened together. When the frame 11 is lowered by removing the jack it will be seen that the support 16 will be placed under tension and will assist in carrying the load. The arms 17 will support the ends of the cross member and brace the same against downward displacement. The support 16 will act to distribute the load over the spring 13 and then to prevent breaking of the same. The rounded bosses 18 will ride on the under surface of the cross member and thus accommodate the distortion of the spring when the same undergoes displacement as will be obvious. It will be seen that when the front end of the automobile is subjected to a severe jolt which would ordinarily fracture the spring or break the cross member, the resilient support will sustain the parts and reduce the liability of breakage to a minimum.

It is obvious that changes in material and dimensions may be made without departing from the spirit of the invention.

What I claim, is:

1. The combination with the rigid cross member of an automobile frame, said cross member having end portions which are inclined upwardly and diverge, and the front elliptical spring arranged beneath the cross member, of a resilient support interposed between the spring and said cross member and having its intermediate portion contacting with the spring and cross member, said resilient support having upwardly extending inclined arms which diverge upwardly and are provided at their ends with rounded portions slidably engaging the inclined end portions of said cross member, said rounded ends being adapted to slide outwardly upon the cross member, and means to clamp the cross member and the intermediate portion of the spring and resilient support together.

2. The combination with the rigid cross member of an automobile frame and the front elliptical leaf spring thereof, of a resilient support in the form of a leaf interposed between the spring and said cross member, said leaf having its outer portions bent upwardly and inclined outwardly with the ends of the said inclined portions slidably contacting with the ends of the cross member to slide outwardly upon the cross member, and means to clamp the cross member and the spring and the resilient support together.

3. The combination with the rigid cross member of an automobile frame, said cross member having end portions which are inclined upwardly and diverge, and the front elliptical spring arranged beneath the cross member, of an approximately U-shaped resilient support interposed between the spring and said cross member and having an intermediate portion contacting with the spring and cross member at the center of said intermediate portion, the end portions of said intermediate portion being arranged in diverging relation to the elliptical leaf spring, said resilient support having upwardly extending inclined arms of substantial length formed upon the outer ends of the intermediate portion, said arms diverging upwardly and provided at their ends with bent portions in permanent slidable engagement with the inclined end portions of said cross member, said bent portions being adapted to slide outwardly upon the cross member, and means to clamp the cross member to the intermediate portion of the spring and the resilient support together.

In testimony whereof I affix my signature.

FRED D. BLANTON.